July 12, 1938.  I. A. EFFRONT  2,123,463
APPARATUS FOR THE MANUFACTURE OF YEAST
Filed April 6, 1935   2 Sheets-Sheet 1

I. A. Effront, Inventor

July 12, 1938.  I. A. EFFRONT  2,123,463
APPARATUS FOR THE MANUFACTURE OF YEAST
Filed April 6, 1935  2 Sheets-Sheet 2

I. A. Effront, Inventor
By Glascock Downing & Seebold
Attys.

Patented July 12, 1938
2,123,463
UNITED STATES PATENT OFFICE
2,123,463
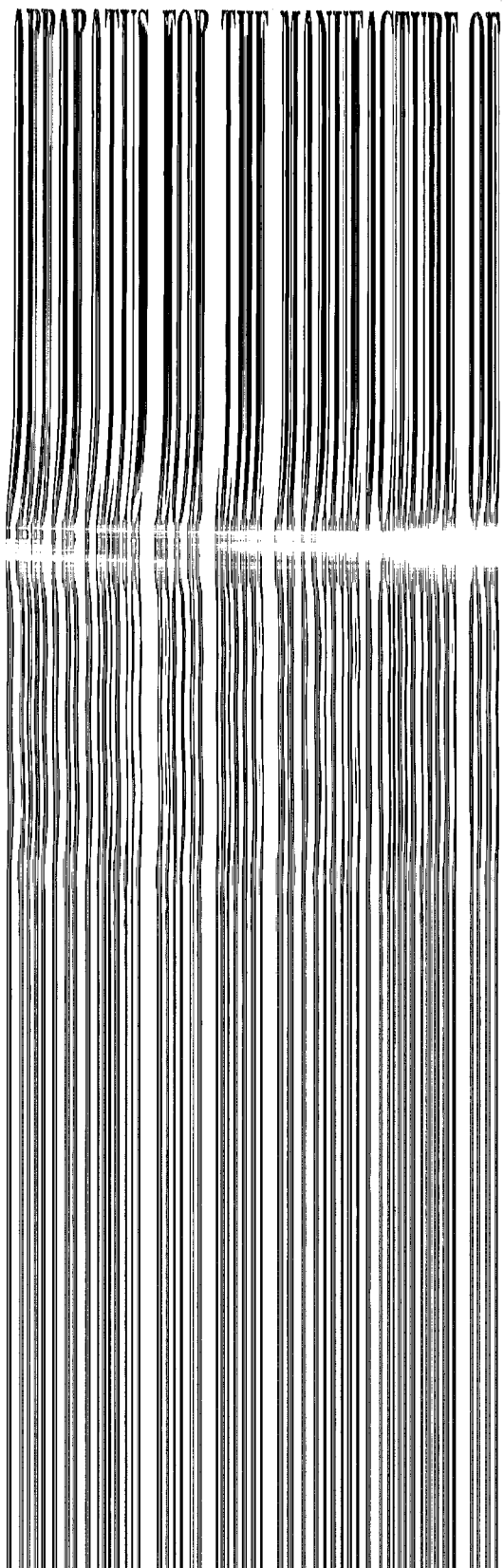

the preceding fermenting batches, the whole or part of the products of fermentation may eventually be reentered into circulation.

Figure 1:
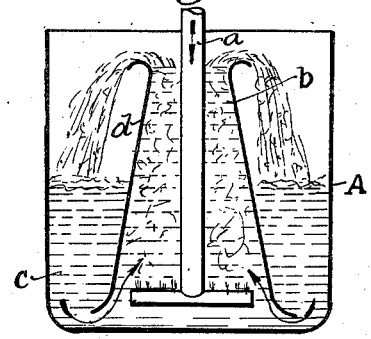
Figure 2:
Figure 3:
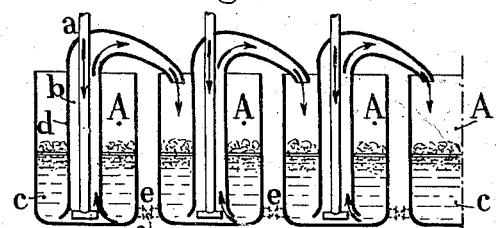
Figure 4:
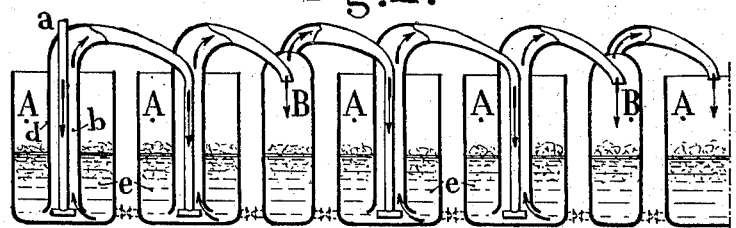
Figure 5:
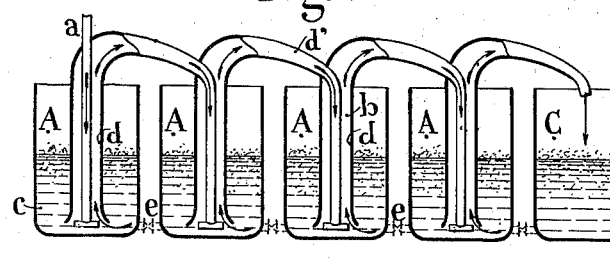

The mixture of air and liquid, such as it rises in the elevating tube of a batch A, may also be directly introduced in the aerating system $a\ b\ d$ of a second fermenting batch A; owing to forcing through the narrow holes of the aerating system, one obtains a still more powerful stirring of the gas and of the liquid. Said operations may be carried out with (Fig. 4) or without (Fig. 5) the interposition of ripening batches B, which are not provided with aerating systems. The whole may be ended by a ripening batch C, as in the previously described example.

In this arrangement, the air and the liquid circulate in a same direction from the one end to the other end of the plant. The batches A may also be connected together in a closed circuit and the withdrawal of the final product then takes place at any point.

Figure 6:
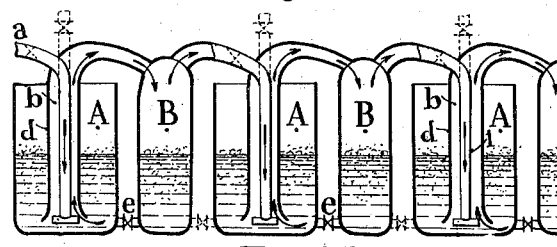

As specified, it is possible to divide into periods a certain processus of fermentation according to the consumption of oxygen or other nutritious substances. In this case, the air and the liquid do not circulate together. Every fermenting batch A comprises the aerating system $a\ b\ d$ hereinbefore described which forces the liquid into a ripening batch B, where the air or other gases escape from the liquid mass and are introduced into the aerating system $a\ b\ d$ of a second fermenting batch A. The liquid, which is separated in the batch B, is returned to the batch A, this being effected through the sucking action of the elevating tube $d$ through a connecting pipe $e, e', e''$ which connects the batch B with the batch A provided with an aerating system $a\ b\ d$. The number of batches A may be equal to the number of periods of which the processus of fermentation is composed. Every one of the batches A is connected to a batch B in which the liquid is sucked to be returned to the batch A, whilst the air or the gases are conveyed to the following batch. Fresh air is introduced during the periods in which the consumption of air is the greatest (first batch at the left of Figs. 2 to 7). The gases escaping from the batch B travel through the following periods in the same proportion in which their consumption of air decreases. The system may be ended by a ripening batch C which may not be provided with an aerating system or which may, according to requirements, be supplied with the gases which are the poorest in oxygen. Of course, the fresh air, in proportion as the processus of fermentation is progressing in the various periods, may be introduced in another batch A (Fig. 6).

Figure 7:
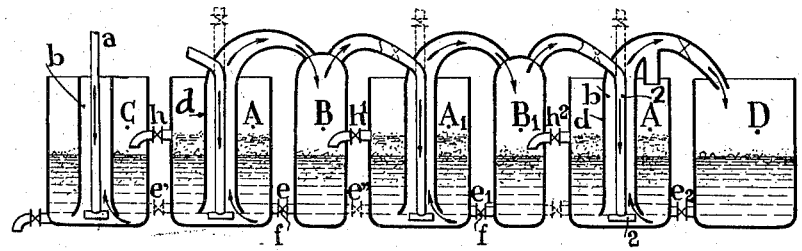

It will be understood that the processus of fermentation may be carried out through circulation in a counter-current if the general arrangement is provided for as indicated in Fig. 7. In this case, the fresh air is also introduced in the first fermenting batch A which is at the left of Fig. 7. The gas and the fermenting liquid are conveyed through the elevating tube $d$ into a ripening batch B. The fermented liquid is led through a trap-outlet to a ripening batch C which may eventually be provided with an aerating device. In the batch B following the batch A, the liquid is separated and the gases are conveyed to a second batch $A_1$ in which another period of fermentation takes place. The content of the said batch, mixed for the most part with the gases, rises so as to be introduced into a batch $B_1$ and, according to the degree of fermentation or of the formation of microorganisms, a part may be conveyed periodically or continuously through a trap-outlet $h_1$ into the preceding batch B. The liquid then passes to the batch $A_2$. The number of batches A and of batches B may correspond to the number of periods into which the processus of fermentation is to be divided.

All of the described arrangements are advantageously provided in their lower part with connecting pipes $e, e', e''$, with a tap $f$ between the various batches A and B; said pipes have been indicated in dotted lines in the figures of the drawings.

In order to act in a favorable manner upon the rate of elevation, the batch may have a shape differing from the usual cylindrical or square shapes with vertical walls. The batch may for instance have a cross-section decreasing upwards or it may be constituted simply by an elevating tube, the return of the liquid towards the aerating device taking place through return pipes $k$ (Fig. 8).

Figures 8, 9:
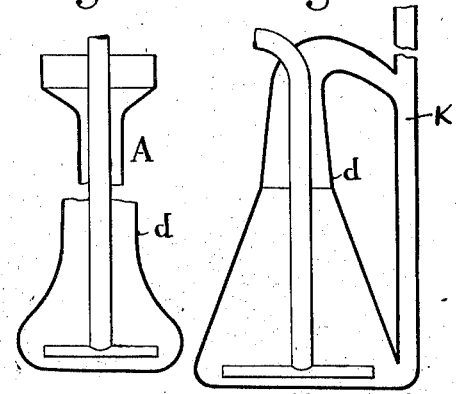

In case the batch is of a sufficient height so as to be able to contain the liquid elevated by the air, the return pipes may be dispensed with (Fig. 9).

I claim:

1. In an apparatus for the manufacture of yeast, the combination of a fermenting batch arranged for containing a liquid mass, an air elevating tube which is standing in said batch and the lower part of which communicates with the interior of said batch, the cross-section of said air elevating tube decreasing upwards in a gradual manner, and an air injecting pipe so arranged as to open in the bottom of said air elevating tube.

2. In a plant for the continuous manufacture of yeast, the combination of a series of fermenting batches, arranged for containing a liquid mass, every one of said batches containing an air elevating tube the lower part of which communicates with the interior of said batch and the cross-section of which is decreasing upwards and in the bottom of which opens an air injecting pipe, said air elevating tube being extended upwardly so as to pass over the edge of the corresponding batch and to open in the top of the following batch, said batches being connected together through pipes at their lower part.

3. A plant as claimed in claim 2, in which the air elevating tube of every one of said fermenting batches opens in a ripening batch whose lower part is connected through a pipe to the lower part of the following fermenting batch.

4. A plant as claimed in claim 2, and arranged in view of a circulation in a counter-current of the liquid mass and of the air, in which every one of the fermenting batches is preceded by a closed ripening batch from the upper part of which starts an air injecting pipe so arranged as to open in the top of the air elevating tube of said fermenting batch, the latter being, on the other hand, connected to said ripening batch through a trap outlet pipe allowing the liquid mass to pass and the air elevating tube of every batch, extended as specified, being so arranged as to open in the top of the ripening batch which precedes the following fermenting batch, the air elevating tube of the first fermenting batch opening in an open batch and the trap outlet of the last fermenting batch opening in a last ripening batch.

IVAN AUGUSTE EFFRONT.